United States Patent
Ide et al.

[15] 3,644,249
[45] Feb. 22, 1972

[54] POLYVINYL CHLORIDE RESIN COMPOSITION HAVING EXCELLENT TRANSPARENCY, SURFACE GLOSS AND IMPACT STRENGTH

[72] Inventors: Fumio Ide; Kenji Okano; Seiji Deguchi, all of Hiroshima, Japan

[73] Assignees: Mitsubishi Rayon Co., Ltd.; Nitto Chemical, Tokyo, Japan

[22] Filed: July 8, 1969

[21] Appl. No.: 839,946

[30] Foreign Application Priority Data

July 10, 1968 Japan.....................................43/48360
July 12, 1968 Japan.....................................43/48854

[52] U.S. Cl.................260/23.7 R, 260/23 XA, 260/23.7 M, 260/876 R
[51] Int. Cl..........................................................C08f 29/22
[58] Field of Search...............260/876, 23.7, 23 X, 890, 80.7

[56] References Cited

UNITED STATES PATENTS 3,288,886 11/1966 Himei et al. ...........................260/876
3,312,756 4/1967 Baer et al...............................260/876

*Primary Examiner*—Donald F. Czaja
*Assistant Examiner*—Donald J. Barrack
*Attorney*—William D. Hall, Elliott I. Pollock, Fred C. Philpitt, George Vande Sande, Charles F. Steininger and Robert R. Priddy

[57] ABSTRACT

PVC resin compositions of improved transparency, surface gloss and impact resistance are obtained by mixing the PVC with a graft polymer. The graft is produced by grafting first methyl methacrylate and then styrene onto an elastomer of butadiene, n-butyl acrylate, and styrene in the proportions shown in the accompanying ternary constitutional diagram. When the monomer(s) used in preparing the aforesaid graft polymer have a small quantity of $C_{10}$ to $C_{18}$ saturated fatty acid dissolved therein, the PVC compositions prepared from the graft polymer show further improvements in their properties.

4 Claims, 1 Drawing Figure

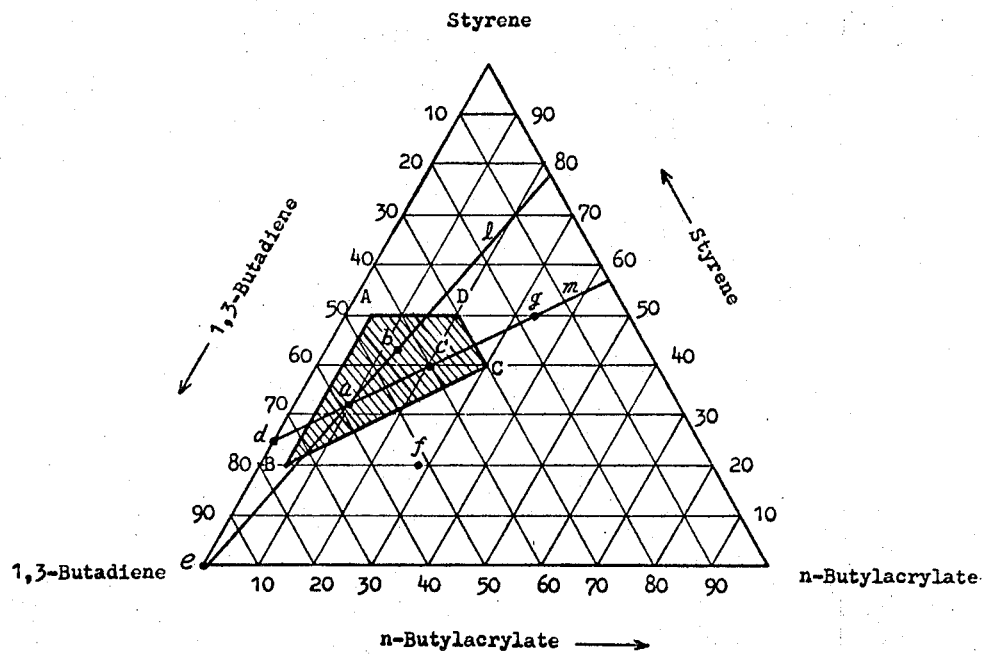

POLYVINYL CHLORIDE RESIN COMPOSITION HAVING EXCELLENT TRANSPARENCY, SURFACE GLOSS AND IMPACT STRENGTH

The present invention relates to a resin composition mainly comprising a polyvinyl chloride resin (hereinafter called "PVC resin") and having excellent transparency, high impact strength, and good surface gloss, in particular, to a resin composition comprising 97–60 parts by weight of a PVC resin and 3–40 parts by weight of a graft polymer prepared by polymerizing first methyl methacrylate in the presence of an elastomer obtained by copolymerizing 75–30 percent by weight 1,3-butadiene, 5–30 percent by weight n-butyl acrylate, and 20–50 percent by weight styrene and thereafter polymerizing styrene.

Furthermore, when in the case of polymerizing the monomers in the presence of the elastomer, a higher saturated fatty acid is added to at least one of the monomers, the graft polymer obtained greatly enhances the processability and the impact strength of the PVC resin composition.

PVC resins are generally inexpensive and have excellent chemical and physical properties. Thus, they are produced commercially on a large scale for many widely varying uses. However, such resins are somewhat inferior in impact strength and hence various studies have been made for overcoming such a difficulty and various improvements have been reported.

It has been suggested that the impact resistance of PVC resins could be improved by blending them with natural or synthetic rubber, or a thermoplastic resin having such rubber as the base. Although thus obtained modified PVC resin composition shows an improved impact strength as compared with that of the original PVC resin, the composition is generally inferior severely in transparency, that is, the transparency which is one of the merits of PVC resin is severely reduced by improving the impact strength.

It has also been reported that when PVC resin is blended with a resin prepared by graft polymerizing a monomer such as styrene, methyl methacrylate, acrylonitrile, etc., to an elastomer such as polybutadiene or styrene-butadiene copolymer (hereinafter called "SBR"), a composition having an improved impact resistance could be obtained without fatally reducing the transparency of PVC resin. However, even in such case, the resin composition prepared has such demerits that the transparency thereof is insufficient and the surface properties of the final product such as the surface gloss and smoothness are degraded by the particle size control of the elastomer, which is an important factor required for maintaining the transparency at the preparation of the composition.

In other words, in the case of using polybutadiene or SBR as the elastomer, the composition having excellent transparency cannot be obtained without reducing the particle size of the elastomer as small as possible but the composition obtained by blending a PVC resin with a graft polymer prepared by using the elastomer having small porticle size has such faults that the surface gloss of PVC resin is reduced and the melt viscosity is high.

An object of the present invention is to improve a low impact strength of PVC resin without reducing the transparency and the surface gloss thereof.

Other object of this invention is to provide a resin composition having excellent transparency, high impact resistance and good surface gloss even if a PVC resin having a relatively low polymerization degree.

Further object of this invention is to provide a resin composition having excellent transparency, high impact resistance, and good surface gloss even by using a molding machine having a weaker mixing power.

As the results of various investigations for obtaining the composition without having aforesaid faults, the inventors have found an elastomer different from conventional elastomers provides a resin composition having excellent properties and by using such elastomer and selecting the combination of the monomer to be graft polymerized to the elastomer and the polymerization conditions, an excellent resin composition having improved impact strength together with excellent transparency and good surface gloss can be obtained.

The portion within area ABCD in the ternary constitutional diagram of the accompanying drawing shows the range of the initial monomer composition constituting the elastomer of 1,3-bitadiene, n-butyl acrylate, and styrene used for preparing the resin composition of the present invention. Straight line $l$ in the figure stands for the azeotropic composition in which the initial monomer composition of 1,3-butadiene, n-butyl acrylate, and styrene is same as the composition thereof in the polymer formed at any moment of polymerization and the azeotropic composition gives the most excellent transparency to the terpolymer itself. Straight line $m$ stands for the composition providing an index of refraction like that of polyvinyl chloride.

By only using the elastomers having such compositions as above, the high transparency can be provided to copolymers prepared therefrom. However if one of such a monomer as other acrylic ester than n-butyl acrylate, vinyl chloride, vinylidene chloride, or acrylonitrile instead of n-butyl acrylate in the elastomer are used, the elastomer thus prepared cannot give a resin composition having excellent transparency, high impact resistance, and good surface gloss.

The merit of using the aforesaid elastomer in the present invention is that the control of the particle size of the elastomer is not so important as in the case of using polybutadiene of SBR. For example, in the case of using polybutadiene or SBR, a good transparency cannot be provided to a PVC resin composition if the elastomer particles having particle sizes less than 0.2 micron are not present therein in a proportion of higher than 90 percent. On the other hand, in the case of using the aforesaid elastomer of this invention, a good transparency can be provided to a resin composition even if the elastomer particles having the particle sizes of higher than 0.2 micron are present in a proportion of only about 40 percent by weight. The fact that such a large particle size elastomer can be used for providing the PVC resin composition having a good transparency greatly contributes to improve the surface gloss of the PVC resin composition and maintain stable properties of the compositions when molded or worked under various conditions.

Moreover, when SBR is employed as the elastomer, the resin has uneven structure and also the transparency and other properties of the final product are largely influenced by the conversion of polymerization of SBR since the structure and the refractive index thereof are varied by the variation in conversion of polymerization thereof. On the other hand, as the elastomer used in the present invention has an azeotropic composition or a composition similar to the azeotropic composition, the elastomer is scarcely influenced by the conversion of polymerization and has a very homogeneous structure.

The composition of the present invention comprises graft polymer (I) prepared by grafting methyl methacrylate and then styrene to a 1,3-butadiene-n-butyl acrylate-styrene elastomer (hereinafter, called "elastomer (E)") and PVC resin (II).

Graft polymer (I) which is one component of the resin composition of this invention may be prepared by grafting first methyl methacrylate to elastomer (E) while adding the monomer to a latex of the elastomer in one fell swoop or continuously and then grafting styrene thereto while adding the styrene in one fell swoop or continuously (process A) but in order to particularly facilitate the kneading of the graft polymer with PVC resin, the graft polymerization is conducted by dissolving a saturated fatty acid having 10–18 carbon atoms in at least one of methyl methacrylate and styrene to be graft polymerized in an amount of 0.5–5 parts by weight per 100 parts by weight of the graft polymer and adding continuously the solution to the polymerization system (process B).

The resin composition comprising the graft polymer prepared by any of the aforesaid processes and a PVC resin has an excellent surface gloss and also even when a PVC resin having a low average degree of polymerization is employed, a resin composition having a very high impact strength can be obtained. On the other hand, when a graft polymer prepared by grafting a mixture of methyl methacrylate and styrene simultaneously to the elastomer is employed, the resin composition obtained is inferior in surface gloss and also if the average degree of polymerization of the PVC resin employed is lower, the composition is also inferior in impact strength.

Furthermore, when the graft polymer prepared by using the monomers, at least one of which contains a saturated fatty acid having 10–18 carbon atoms is employed, the resin composition prepared is very effective for providing a product having excellent surface gloss and high impact strength by using a molding machine having a weak kneading power.

The typical examples of the saturated fatty acids used in process B shown above there are capric acid, palmitic acid, lauric acid, myristic acid, and stearic acid and they may be used alone or as a mixture thereof.

In the case of conducting the graft polymerization by process A, methyl methacrylate and/or styrene may be added in one fell swoop or may be added continuously.

When the monomer is added continuously, the sheet or film formed by extruding the resin composition is superior in surface gloss and the board of the composition formed by molding is superior in transparence as compared with the case of adding the monomer in one fell swoop but the impact strength of the resin composition is low in the former case.

On the other hand, in process B wherein the saturated fatty acid is employed, it is necessary to add continuously the monomer containing the saturated fatty acid to elastomer (E) over an at least 30-minute period and otherwise, a large amount of coagulates are formed, which reduce the transparency and the surface gloss of the final product.

Furthermore, it is necessary that graft polymer (I) be composed of 30–70 percent by weight elastomer (E) and 70–30 percent by weight the total amount of methyl methacrylate and styrene to be grafted thereto, and also the graft monomer to be grafted be composed of 10–50 percent by weight of methyl methacrylate and 90–50 percent by weight of styrene. If a graft polymer having other composition than above is employed, at least one of the transparency, impact resistance, surface gloss and other mechanical properties of the resin composition prepared therefrom becomes low.

The graft polymerization is generally carried out at a temperature of 30°–100° C. in the presence of a usual polymerization initiator. Furthermore, if necessary, a small amount of an emulsifier, a chain transfer agent and a modifier may be employed.

The latex of the graft polymer thus prepared is coagulated by a known method, washed with water and then dried.

PVC resin (II) which is other component of the resin composition of the present invention may be polyvinyl chloride or a copolymer of more than 70 percent by weight of vinyl chloride and less than 30 percent by weight of at least one monomer of vinyl bromide, vinylidene chloride, vinyl acetate, acrylic acid and methacrylic acid. The PVC resin used in the present invention may be prepared by a conventional emulsion polymerization, suspension polymerization, or bulk polymerization.

For obtaining the resin composition of this invention, 3–40 parts by weight of graft polymer (I) is blended with 97–60 parts by weight of PVC resin (II) to provide 100 parts by weight of the final product. When the proportion of graft polymer (I) is less than 3 parts by weight, no effect of adding the polymer is obtained, while if the proportion of the polymer is higher than 40 parts by weight, other excellent properties of PVC resin than transparency will be lowered as well as the use of such a large proportion of polymer is not economical. The particularly preferable composition of the present invention comprises 10–30 parts by weight of graft polymer (I) and 90–70 parts by weight of PVC resin (II).

Graft polymer (I) is blended with PVC resin (II) by using a conventional mixing means. For example, they may be mixed by a mixing roll, a Banbury mixer, or a plastograph as well as a molding machine such as a compounding extruder and a blow molder. Also, they may be premixed by means of a ribbon blender or a Henschel mixer before mixing them by means of the aforesaid mixing machine. Moreover, as mixing, there may be added to the system, if necessary, a conventional stabilizer, a plasticizer, a lubricating agent, a pigment, a filler, etc.

Now, the invention will be explained more in detail by the following examples although the invention shall not be limited to them. In the examples, "part" and "percent" mean "part by weight" and "percent by weight" respectively.

EXAMPLE 1

Synthesis of Elastomer (E-1)

| | |
|---|---|
| 1,3-Butadiene | 57 parts |
| n-Butyl acrylate | 10 parts |
| Styrene | 33 parts |
| Potassium oleate | 2 parts |
| Potassium persulfate | 0.3 parts |
| t-Dodecyl mercaptan | 0.5 parts |
| Deionized water | 180 parts |

The above mixture was charged in an autoclave and after purging with nitrogen, polymerization was carried out for 15 hours at 55° C. with stirring to provide the elastomer (E-1) with a conversion of 97 percent.

Preparation of Graft Polymer (G-1)

| | |
|---|---|
| Elastomer (E-1) | 50 parts |
| Methyl methacrylate | 20 parts |
| Styrene | 30 parts |
| Potassium persulfate | 0.5 parts |
| Deionized Water | 200 parts |

Thus, according to the aforesaid composition, 20 parts of methyl methacrylate and 0.2 part of potassium persulfate were first added to a latex of elastomer (E-1), and the mixture was reacted for 3 hours at 70° C. Thereafter, 30 parts of styrene and remaining 0.3 part of potassium persulfate were added to the product thus prepared and then the graft polymerization was carried out for 3 hours at 70° C. to provide a latex of graft polymer (G-1). The latex of graft polymer thus formed was coagulated by a 0.2 percent aqueous sulfuric acid solution followed by washing with water and then drying to provide white powders of graft polymer (G-1).

In a Henschel mixer were blended 10 parts by weight of the graft polymer and 90 parts by weight of PVC resin (having average degree of polymerization ($\overline{P}$) of 750) together with 2 parts of dibutyl-tin-maleate, 1 part of butyl stearate and 1 part of dibutyl-tin-laurate per 100 parts of PVC resin for 20 minutes. The compound thus obtained was extruded by means of an extruder having T-die to provide a sheet of the resin composition and the properties of the sheet were measured, the results of which are shown below.

| | |
|---|---|
| Impact strength[1] | 71.6 kg.-cm./mm. |
| Gloss[2] | 96.0% |
| Luminous transmittance[3] | 80.6% |
| Haze[4] | 4.3% |

(Note)

[1]Sheet impact strength measured according to B.S. 1524-1955 (0.3-mm. sheet thick)

[2]Gloss = (Reflection index/Reflection index of PVC) × 100 (percent)

The reflection index (an angle of incidence of 60°) was measured by using a gloss meter UGV-2 (made by Toyo Rika Instruments Inc., Japan)

[3]Total luminous transmittance measured according to ASTM D-1003-61 (press molded sheet)

[4]Measured according to ASTM D1003-61

EXAMPLES 2-7

The elastomers having the compositions shown in Table 1 were prepared and graft polymers were prepared using the elastomers. The same procedure as in Example 1 was conducted using the graft polymers and PVC ($\bar{P}$ 750) to provide the resin compositions of the present invention and the properties of them were measured. For comparison, other resin compositions than those of the present invention having the composition outside the area ABCD of the ternary constitutional diagram were prepared and the properties of them were also measured.

Each graft polymer was prepared by grafting first 18 parts of methyl methacrylate in the presence of a latex containing 50 parts of elastomer (average particle size of 0.16 micron) and then by grafting 32 parts of styrene.

TABLE 1

| Example No. | Elastomer composition (percent) Bd | BA | St | Position in the diagram | PVC/graft polymer | Impact strengt (kg.-cm./mm.) | Total luminous transmittance (percent) |
|---|---|---|---|---|---|---|---|
| Example 2 | 57 | 10 | 33 | a | 92/8 | 58.4 | 80.6 |
| Example 3 | 57 | 10 | 33 | a | 85/15 | 87.6 | 80.2 |
| Example 4 | 45 | 12 | 43 | b | 92/8 | 55.2 | 78.6 |
| Example 5 | 45 | 12 | 43 | b | 85/15 | 81.4 | 77.9 |
| Example 6 | 40 | 20 | 40 | c | 92/8 | 54.0 | 78.2 |
| Example 7 | 40 | 20 | 40 | c | 85/15 | 79.1 | 77.1 |
| Comparative Example 1 | 75 | 0 | 25 | d | 92/8 | 59.6 | 75.0 |
| Comparative Example 2 | 75 | 0 | 25 | d | 85/15 | 89.0 | 69.0 |
| Comparative Example 3 | 100 | 0 | 0 | e | 92/8 | 61.2 | 69.5 |
| Comparative Example 4 | 100 | 0 | 0 | e | 85/15 | 90.8 | 58.0 |
| Comparative Example 5 | 52 | 28 | 20 | f | 92/8 | 49.6 | 62.5 |
| Comparative Example 6 | 52 | 28 | 20 | f | 85/15 | 70.2 | 59.1 |
| Comparative Example 7 | 17 | 33 | 50 | g | 92/8 | 31.6 | 69.4 |
| Comparative Example 8 | 17 | 33 | 50 | g | 85/15 | 40.2 | 59.8 |

(note):

Bd: 1,3-butadiene
BA: n-butyl acrylate
St: styrene

As is clear from Table 1, the use of elastomers having compositions defined by points included in the area ABCD in figure results in resin compositions having excellent transparency as compared to those prepared with the elastomer having compositions outside the area ABCD.

EXAMPLES 8-11

Elastomer/latices each having different average particle size were prepared by using a mixture of 57 percent 1,3-butadiene, 10 percent n-butyl acrylate, and 33 percent styrene. Thereafter, 25 parts of methyl methacrylate was first grafted to 45 parts of the elastomers and then 30 parts of styrene was grafted thereto to provide graft polymers. Resin compositions consisting of 20 parts of the graft polymers and 80 parts of PVC ($\bar{P}$750) were prepared and their luminous transmittances were measured, the results of which are shown in Table 2.

For comparison, comparative resin compositions prepared by using the same amount of polybutadiene or SBR (23.5 percent styrene) were prepared and their luminous transmittances were also measured.

TABLE 2

| Example No. | Elastomer employed | Average grain size of the elastomer ($\mu$) | Total luminous transmittance (%) |
|---|---|---|---|
| Example 8 | Bd/BA/St- 57/10/33 | 0.07 | 78.6 |
| Example 9 | '' | 0.12 | 77.2 |
| Example 10 | '' | 0.18 | 76.0 |
| Example 11 | '' | 0.23 | 73.9 |
| Comparative Example 9 | Polybutadiene | 0.07 | 69.4 |
| Comparative Example 10 | '' | 0.12 | 63.2 |
| Comparative Example 11 | '' | 0.18 | 58.4 |
| Comparative Example 12 | '' | 0.23 | 51.3 |
| Comparative Example 13 | SBR | 0.07 | 76.0 |
| Comparative Example 14 | '' | 0.12 | 70.5 |
| Comparative Example 15 | '' | 0.18 | 66.3 |
| Comparative Example 16 | '' | 0.23 | 60.1 |

As clear from Table 2, the transparency of the resin composition prepared by using polybutadiene or SBR as elastomer was largely influenced by the particle size of the elastomer. That is, in the case of using polybutadiene, the transparency of the resin composition was reduced when the particle size of the elastomer was larger than 0.12 micron and also in the case of using SBR as the elastomer, the transparency was reduced when the particle size was larger than 0.18 micron. On the other hand, in the case of using the elastomer in the present invention, the resin composition having good transparency was obtained even when the elastomer having a comparatively large particle size was employed.

This is because the elastomer used in the present invention has a uniform component distribution, a good compatibility with and a nearly same refractive index as those of PVC, and also provide a graft polymer having a high grafting efficiency since the elastomer is properly swollen with the monomer to be grafted to the elastomer.

EXAMPLES 12-14

To 50 parts of the elastomer consisting of 57 percent 1,3-butadiene, 10 percent n-butyl acrylate, and 33 percent styrene was grafted 50 parts of the monomers as shown in Table 3 to provide graft polymers. The properties of the resin compositions consisting of 8 parts of the graft polymers and 92 parts of PVC having a degree of polymerization of 710 are shown in Table 3.

TABLE 3

| Example No. | Grafting Monomer Composition St | MMA | Grafting | Properties of the products Gloss | Haze (%) |
|---|---|---|---|---|---|
| Example 12 | 90 | 10 | I | 82.6 | 13.4 |
| Example 13 | 70 | 30 | I | 94.5 | 4.9 |
| Example 14 | 60 | 40 | I | 96.5 | 4.0 |
| Comparative Example 17 | 70 | 30 | II | 71.5 | 8.3 |
| Comparative Example 18 | 60 | 40 | II | 70.4 | 8.8 |
| Comparative Example 19 | 95 | 5 | I | 62.5 | 18.6 |

MMA: Methyl methacrylate
St: Styrene
I: Two-stage grafting method (MMA was first polymerized in the presence of elastomer and then St was polymerized).
II: One-stage grafting method (a mixture of MMA and St was polymerized in the presence of elastomer).

As shown in the above Table 3, the product obtained by the process of this invention was very excellent in gloss as compared with one prepared by grafting MMA and St simultaneously.

EXAMPLES 15–18

To 55 parts of the elastomer consisting of 57 percent 1,3-butadiene, 10 percent n-butyl acrylate, and 33 percent styrene was grafted methyl methacrylate while supplying continuously the methyl methacrylate having dissolved therein a saturated fatty acid over a 1-hour period and then styrene was grafted to the product while supplying continuously the styrene having dissolved therein a saturated fatty acid over a 1-hour period to provide a graft polymer. A resin composition consisting of 10 parts of the graft polymer thus prepared and 90 parts of PVC (P̄ 750) was extruded into sheet by means of an extruder equipped with a T-die and the properties of it were measured, the results of which are shown in Table 4.

TABLE 4

| Example No. | Monomer grafted (1st step) | | Monomer grafted (2d step) | | Impact strength (kg.-cm./mm.) | Gloss (percent) |
|---|---|---|---|---|---|---|
| | Monomer (parts) | Fatty acid (parts) | Monomer | Fatty acid (parts) | | |
| 15 | MMA(20) | Stearic acid (1.0) | St(25) | Stearic acid (2.5) | 86.4 | 93 |
| 16 | MMA(20) | Myristic acid (1.0) | St(25) | Myristic acid (2.0) | 80.4 | 94 |
| 17 | MMA(20) | Palmitic acid (1.5) | St(25) | Palmitic acid (2.5) | 82.3 | 96 |
| 18 | MMA(14) | Stearic acid (1.0) | St(31) | Stearic acid (1.0) | 81.9 | 94 |

EXAMPLE 19

To 55 parts of the elastomer consisting of 65 percent 1,3-butadiene, 12 percent n-butyl acrylate and 23 percent styrene was added and grafted continuously by using a potassium persulfate initiator at 70° C. first 17 parts of methyl methacrylate while supplying the monomer having dissolved therein 1 part of stearic acid over a 1-hour period. Thereafter, 28 parts of styrene having dissolved therein 2 parts of stearic acid was added and grafted continuously at 70° C. over a 1-hour period to provide a graft polymer. From 7 parts of the graft polymer and 93 parts of PVC (P̄ 700), a resin composition was prepared. The impact strength, surface gloss and luminous transmittance of the composition were 54.8 kg.-cm./mm., 95.2 percent and 80.6 percent respectively.

EXAMPLE 20

To 60 parts of the elastomer consisting of 57 percent 1,3-butadiene, 10 percent n-butyl acrylate, and 33 percent styrene was added and grafted continuously by using a potassium persulfate initiator at 70° C. first 12 parts of methyl methacrylate over a 2-hour period and the graft polymerization was continued for 1 hour with stirring. Thereafter, 28 parts of styrene was continuously added to the system and grafted over a 2-hour period and the graft polymerization was continued for 1 hour with stirring to provide a graft polymer. From 10 parts of the graft polymer thus obtained and 90 parts of PVC (P̄ 750) was prepared the resin composition. The impact strength, gloss and luminous transmittance of the composition were 78.2 kg.-cm./mm., 94.2 percent, and 78.8 percent respectively.

What is claimed is:
1. A resin composition comprising
   I. 3–40 parts by weight of a graft polymer prepared by polymerizing first 10–50 percent by weight methyl methacrylate in the presence of 30–70 parts by weight of elastomer (E) prepared by copolymerizing a monomer mixture comprising 75–30 percent by weight 1,3-butadiene, 5–30 percent by weight n-butyl acrylate, and 20–50 percent by weight styrene and having the component ratio within area (ABCD) in the ternary constitutional diagram of the accompanying drawing and then polymerizing 90–50 percent by weight styrene, the total amount of said monomers being 70–30 parts by weight, and
   II. 97–60 parts by weight of polyvinyl chloride or 97–60 parts by weight of a copolymer comprising more than 70 percent by weight vinyl chloride and less than 30 percent by weight at least one of vinyl bromide, vinyl acetate, vinylidene chloride, acrylic acid and methacrylic acid.
2. The resin composition as claimed in claim 1 wherein said graft polymer is prepared by polymerizing methyl methacrylate and styrene while adding continuously at least one of the monomers to the elastomer over an at least 30-minute period.
3. The resin composition as claimed in claim 1 wherein at least one of methyl methacrylate and styrene to be polymerized in the presence of elastomer (E) has uniformly dissolved therein 0.5–5 percent by weight based on said graft polymer of a saturated fatty acid having 10–18 carbon atoms.
4. The resin composition as claimed in claim 1 wherein said elastomer (E) is a terpolymer comprising 55–60 percent by weight 1,3-butadiene, 8–13 percent by weight n-butyl acrylate, and 30–38 percent by weight styrene.

* * * * *